(12) United States Patent
Bi et al.

(10) Patent No.: US 12,238,674 B2
(45) Date of Patent: Feb. 25, 2025

(54) POSITIONING METHOD AND APPARATUS, TERMINAL DEVICE AND STORAGE MEDIUM

(71) Applicant: ZTE Corporation, Shenzhen (CN)

(72) Inventors: Cheng Bi, Shenzhen (CN); Mengzhen Wang, Shenzhen (CN); Chuangxin Jiang, Shenzhen (CN); Huahua Xiao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 380 days.

(21) Appl. No.: 17/762,136

(22) PCT Filed: Jun. 16, 2020

(86) PCT No.: PCT/CN2020/096379
§ 371 (c)(1),
(2) Date: Mar. 21, 2022

(87) PCT Pub. No.: WO2021/051905
PCT Pub. Date: Mar. 25, 2021

(65) Prior Publication Data
US 2022/0377697 A1 Nov. 24, 2022

(30) Foreign Application Priority Data

Sep. 20, 2019 (CN) .......................... 201910895171.8

(51) Int. Cl.
*H04W 64/00* (2009.01)
*G01S 5/00* (2006.01)
(Continued)

(52) U.S. Cl.
CPC .......... *H04W 64/003* (2013.01); *G01S 5/0036* (2013.01); *G01S 5/0236* (2013.01); *G01S 5/10* (2013.01)

(58) Field of Classification Search
CPC .. H04W 64/003; G01S 5/0036; G01S 5/0236; G01S 5/10
See application file for complete search history.

(56) References Cited

U.S. PATENT DOCUMENTS 10,082,559 B1 9/2018 Saxon
2012/0244884 A1 9/2012 Lim
(Continued)

FOREIGN PATENT DOCUMENTS

CN 102026266 A 4/2011
CN 107371139 A 11/2017
(Continued)

OTHER PUBLICATIONS

International Search Report for corresponding application PCT/CN2020/096379 filed Jun. 16, 2020; Mail date Sep. 10, 2020.

*Primary Examiner* — Moustapha Diaby
(74) *Attorney, Agent, or Firm* — CANTOR COLBURN LLP

(57) ABSTRACT

A positioning method and apparatus, a terminal device and a storage medium are provided. The method includes: receiving positioning assistance information; performing positioning measurement according to the positioning assistance information; and positioning a target terminal by using a result of the positioning measurement. By means of the solution, the positioning of a terminal device in a Vehicle to Everything (V2X) scenario can be realized.

19 Claims, 9 Drawing Sheets

(51) Int. Cl.
    *G01S 5/02*         (2010.01)
    *G01S 5/10*         (2006.01)

(56)         References Cited

U.S. PATENT DOCUMENTS

| | | |
|---|---|---|
| 2016/0095080 A1 | 3/2016 | Khoryaev et al. |
| 2017/0223655 A1* | 8/2017 | Huang .................. H04L 5/0048 |
| 2017/0288897 A1 | 10/2017 | You |
| 2018/0213498 A1* | 7/2018 | Khoryaev ............ H04B 7/2684 |
| 2019/0230618 A1 | 7/2019 | Saur et al. |
| 2019/0327707 A1* | 10/2019 | Agnihotri ............. G01S 5/0236 |
| 2020/0264261 A1* | 8/2020 | Akkarakaran ........ H04L 5/0051 |
| 2021/0297216 A1* | 9/2021 | Shreevastav .............. G01S 1/20 |
| 2022/0174641 A1* | 6/2022 | Cha ......................... H04L 5/005 |

FOREIGN PATENT DOCUMENTS

| | | |
|---|---|---|
| CN | 109389848 A | 2/2019 |
| CN | 111093154 A | 5/2020 |
| WO | 2018107380 A1 | 6/2018 |
| WO | 2019141090 A1 | 7/2019 |
| WO | 2019153129 A1 | 8/2019 |

* cited by examiner

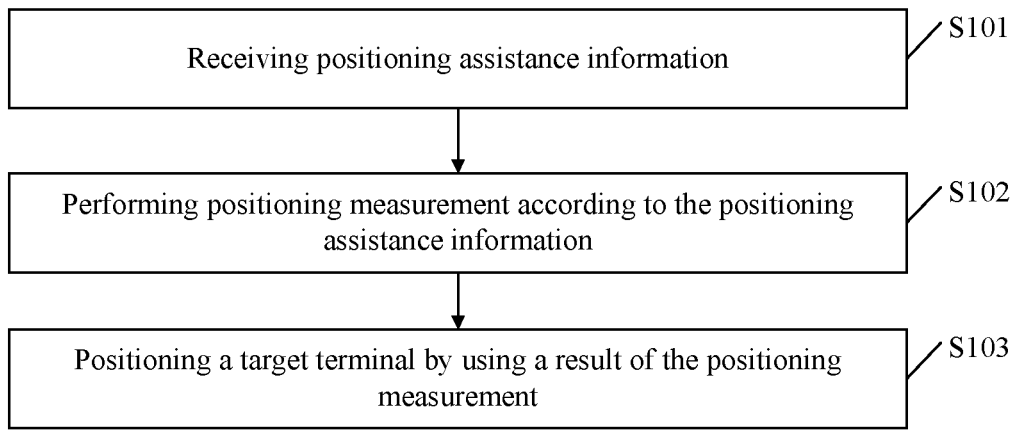
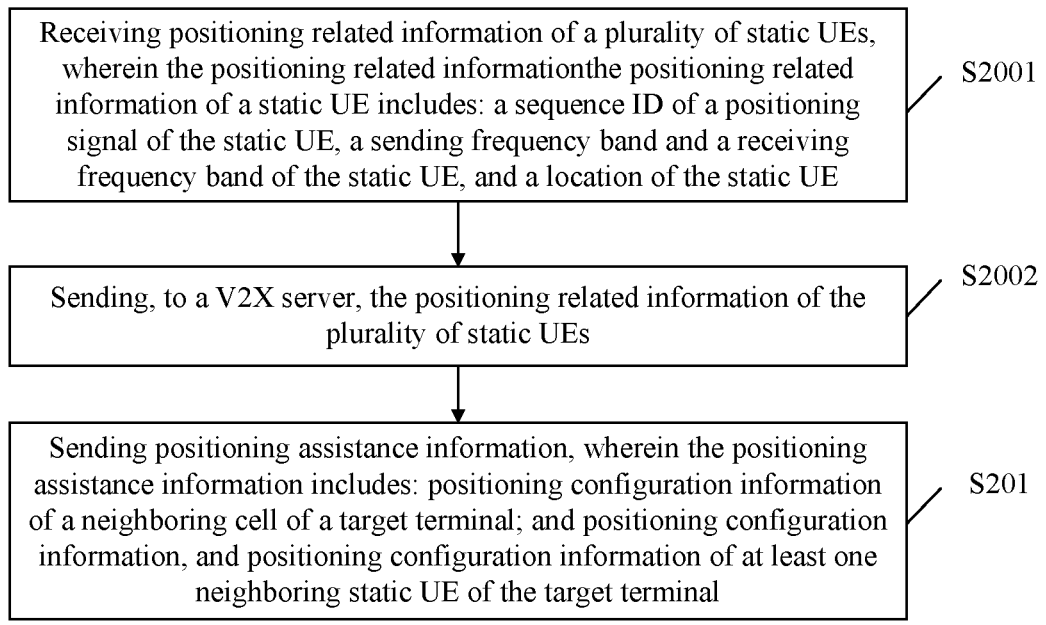

POSITIONING METHOD AND APPARATUS, TERMINAL DEVICE AND STORAGE MEDIUM

CROSS REFERENCE

This application is a National Stage Filing of the PCT International Application No. PCT/CN2020/096379 filed on Jun. 16, 2020, which claims priority to Chinese Application No. 201910895171.8 filed on Sep. 20, 2019, the entirety of which is herein incorporated by reference.

TECHNICAL FIELD

The present disclosure relates to the field of communications, and in particular to a positioning method and apparatus, a terminal device and a storage medium.

BACKGROUND

Vehicle to Everything (V2X) is a new generation of information communication technology that connects a vehicle to everything. In the current stage, X mainly includes vehicles, people, traffic roadside infrastructure and networks. In main application scenarios of V2X, acquisition of precise location information of a terminal device plays a crucial role in improving the performance. However, V2X cannot completely rely on an ordinary terminal positioning flow due to its unique working architecture and performance requirements, especially cross-operator requirements. In the related art, there is no terminal device positioning method for V2X scenarios.

SUMMARY

Embodiments of the present disclosure provide the following solutions, which can solve at least one of the above technical problems.

The embodiments of the present disclosure provide a positioning method, including: receiving positioning assistance information; performing positioning measurement according to the positioning assistance information; and positioning a target terminal by using a result of the positioning measurement.

The embodiments of the present disclosure provide an information transmission method, including: sending positioning assistance information, wherein the positioning assistance information includes: positioning configuration information of a neighboring cell of a target terminal, and positioning configuration information of at least one neighboring static user equipment (UE) of the target terminal.

The embodiments of the present disclosure provide an information transmission method, including: sending positioning assistance information, wherein the positioning assistance information includes: positioning configuration information of at least two neighboring static UEs of a target terminal.

The embodiments of the present disclosure provide an information transmission method, including: sending positioning related information, wherein the positioning related information includes: a sequence ID of a positioning signal of a static UE, a sending frequency band and a receiving frequency band of the static UE, and a location of the static UE.

The embodiments of the present disclosure provide a positioning apparatus, including: a receiving module, configured to receive positioning assistance information; a measurement module, configured to perform positioning measurement according to the positioning assistance information; and a positioning module, configured to position a target terminal by using a result of the positioning measurement.

The embodiments of the present disclosure provide an information transmission apparatus, including: a first sending module, configured to send positioning assistance information, wherein the positioning assistance information includes: positioning configuration information of a neighboring cell of a target terminal, and positioning configuration information of at least one neighboring static UE of the target terminal.

The embodiments of the present disclosure provide an information transmission apparatus, including: a second sending module, configured to send positioning assistance information, wherein the positioning assistance information includes: positioning configuration information of at least two neighboring static UEs of a target terminal.

The embodiments of the present disclosure provide an information transmission apparatus, including: a third sending module, configured to send positioning related information, wherein the positioning related information includes: a sequence ID of a positioning signal of a static UE, a sending frequency band and a receiving frequency band of the static UE, and a location of the static UE.

The embodiments of the present disclosure provide a terminal for positioning, including: a processor and a memory, wherein the memory is configured to store an instruction; and the processor is configured to read the instruction to execute the positioning method as described above.

The embodiments of the present disclosure provide a positioning server for information transmission, wherein the positioning server includes: a processor and a memory; the memory is configured to store an instruction; and the processor is configured to read the instruction to execute the first information transmission method as described above.

The embodiments of the present disclosure provide a V2X server for information transmission, wherein the V2X server includes: a processor and a memory; the memory is configured to store an instruction; and the processor is configured to read the instruction to execute the second information transmission method as described above.

The embodiments of the present disclosure provide a static UE for information transmission, wherein the static UE includes: a processor and a memory; the memory is configured to store an instruction; and the processor is configured to read the instruction to execute the third information transmission method as described above.

The embodiments of the present disclosure provide a storage medium, wherein a computer program is stored in the storage medium, and when executed by a processor, the computer program implements any one of the above methods.

According to the positioning method provided by the embodiments of the present disclosure, by performing positioning measurement according to the received positioning assistance information, and positioning the target terminal by using the measurement result, the positioning of a terminal device in a V2X scenario is realized.

BRIEF DESCRIPTION OF THE DRAWINGS

FIG. 1 is a schematic diagram of an implementation flow of a positioning method according to some embodiments of the present disclosure;

FIG. 2 is a schematic diagram of an implementation flow of an information transmission method according to some embodiments of the present disclosure;

DETAILED DESCRIPTION

Figure 3:
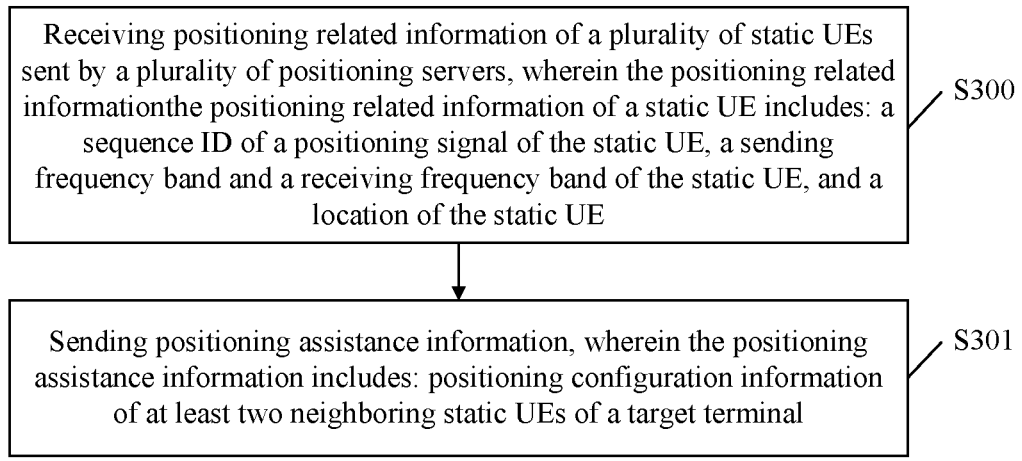
FIG. 3 is a schematic flowchart of an implementation flow of another information transmission method according to some embodiments of the present disclosure.

In order to make the objectives, technical solutions and advantages of the present disclosure clearer, the embodiments of the present disclosure will be described in detail below in combination with the drawings. It should be noted that, if there is no conflict, the embodiments in the present disclosure and the features of the embodiments may be arbitrarily combined with each other.

The embodiments of the present disclosure propose a positioning method. FIG. 1 is a schematic diagram of an implementation flow of a positioning method according to some embodiments of the present disclosure, as shown in FIG. 1, the positioning method includes operations S101 to S103 which are described in detail below.

At S101, positioning assistance information is received.

At S102, positioning measurement is performed according to the positioning assistance information.

At S103, a target terminal is positioned by using a result of the positioning measurement.

The present embodiment may be applied to the target terminal.

In an implementation, the above positioning assistance information includes: positioning configuration information of a neighboring cell, and positioning configuration information of at least one neighboring static UE, wherein the at least one neighboring static UE belongs to a same Public Land Mobile Network (PLMN). In this case, the target terminal may be in a connected state within the coverage of a wireless communication network.

The positioning configuration information of the neighboring cell may specifically be Positioning Reference Signal (PRS) configuration information of the neighboring cell. The positioning configuration information of the neighboring static UE may specifically be SideLink Positioning Reference Signal (SL PRS) configuration information of the neighboring static UE.

In an implementation, the above operation S101 includes: the positioning assistance information is received from a positioning server; or, the positioning assistance information that is sent from a positioning server and forwarded by one or more other terminals is received, wherein the one or more other terminals are one or more terminals that are in connection with the target terminal via a PC5 interface. The PC5 interface is an interface of a secure communication link that can be directly established and released between two terminals.

In an implementation, the above operation S102 includes: positioning measurement is performed on a positioning signal of the neighboring cell and a positioning signal of the at least one neighboring static UE according to the positioning assistance information.

The positioning signal of the neighboring cell may specifically be a PRS of the neighboring cell. The positioning signal of the neighboring static UE may specifically be an SL PRS of the neighboring static UE.

In an implementation, the positioning assistance information includes: positioning configuration information of at least two neighboring static UEs, wherein the at least two neighboring static UEs belong to different PLMNs. In this case, the target terminal may be in a connected state within the coverage of a wireless communication network.

In an implementation, the above operation S101 includes: the positioning assistance information is received from a V2X server; or, the positioning assistance information that is sent from a V2X server and forwarded by one or more other terminals is received, wherein the one or more other terminals are one or more terminals that are in connection with the target terminal via a PC5 interface.

In an implementation, the above operation S102 includes: positioning measurement is performed on positioning signals of the at least two neighboring static UEs according to the positioning assistance information.

In an implementation, the positioning assistance information includes: positioning configuration information of at least two neighboring static UEs, wherein the at least two neighboring static UEs belong to a same PLMN or different PLMNs. In this case, the target terminal may be beyond the coverage of the wireless communication network, but is connected to a terminal within the coverage of the wireless communication network via a PC5 interface.

In an implementation, the above operation S101 includes: the positioning assistance information is received from the at least two neighboring static UEs.

In an implementation, the above operation S102 includes: positioning measurement is performed on positioning signals of the at least two neighboring static UEs according to the positioning assistance information.

In the above embodiments, the positioning configuration information of the neighboring static UE may include: a sequence ID of a positioning signal of the neighboring static UE, a sending frequency band and a time domain location of the neighboring static UE, and a location of the neighboring static UE.

The positioning configuration information of the neighboring static UE may specifically be SL PRS configuration information of the neighboring static UE. The positioning signal of the neighboring static UE may specifically be SL PRS of the neighboring static UE.

The above is a downlink positioning process of the target terminal. The downlink positioning may refer to a process that a target terminal positions itself according to a received signal. An uplink positioning process of the target terminal will be described below. The uplink positioning may refer to a process that one or more other devices or a server position the target terminal according to a signal sent by the target terminal.

In an implementation, the above method further includes: positioning configuration information of the target terminal is sent.

In an implementation, the operation that the positioning configuration information of the target terminal is sent may include: the positioning configuration information of the target terminal is sent to a positioning server, a V2X server, or one or more terminals that are in connection with the target terminal via a PC5 interface.

In an implementation, the positioning configuration information of the target terminal includes: a sequence ID of a positioning signal of the target terminal, and a sending frequency band and a time domain location of the target terminal.

The positioning configuration information of the target terminal may specifically be PRS configuration information of the target terminal. The positioning signal of the target terminal may specifically be SL PRS of the target terminal.

The embodiments of the present disclosure also propose an information transmission method. FIG. 2 is a schematic diagram of an implementation flow of an information transmission method according to some embodiments of the present disclosure, as shown in FIG. 2, the information transmission method includes operation S201 which is described in detail below.

At S201, positioning assistance information is sent, wherein the positioning assistance information includes: positioning configuration information of a neighboring cell of a target terminal, and positioning configuration information of at least one neighboring static UE of the target terminal.

The above embodiment may be applied to a positioning server.

In an implementation, the at least one neighboring static UE belongs to a same PLMN.

In an implementation, the above operation S201 includes: the positioning assistance information is sent to the target terminal or one or more other terminals, wherein the one or more other terminals are one or more terminals that are in connection with the target terminal via a PC5 interface.

In an implementation, as shown in FIG. 2, before the above operation S201, the method may further include operation S2001. At S2001, positioning related information of a plurality of static UEs is received, wherein the positioning related information of a static UE includes: a sequence ID of a positioning signal of the static UE, a sending frequency band and a receiving frequency band of the static UE, and a location of the static UE.

In an implementation, as shown in FIG. 2, the method may further include operation S2002. At S2002, the positioning related information of the plurality of static UEs is sent to a V2X server.

The above embodiment provides an example of content transmitted by the positioning server to complete downlink positioning of the target terminal. An example of the content transmitted by the positioning server to complete uplink positioning of the target terminal will be described below.

In an implementation, the above method further includes: positioning configuration information of the target terminal is received; and the positioning configuration information of the target terminal is forwarded to at least two neighboring static UEs of the target terminal respectively.

The at least two static UEs may belong to a same PLMN.

In an implementation, the operation that the positioning configuration information of the target terminal is received includes: the positioning configuration information is received from the target terminal; or, the positioning configuration information that is sent from the target terminal and forwarded by one or more other terminals is received, wherein the one or more other terminals are one or more terminals that are in connection with the target terminal via a PC5 interface.

The positioning configuration information of the target terminal may include: a sequence ID of a positioning signal of the target terminal, and a sending frequency band and a time domain location of the target terminal.

The embodiments of the present disclosure also propose another information transmission method. FIG. 3 is a schematic diagram of an implementation flow of the other information transmission method according to some embodiments of the present disclosure. The information transmission method includes operation S301.

At S301, positioning assistance information is sent, wherein the positioning assistance information includes: positioning configuration information of at least two neighboring static UEs of a target terminal.

The present embodiment may be applied to a V2X server.

In an implementation, the at least two neighboring static UEs belong to a same PLMN or different PLMNs.

In an implementation, the above operation 301 includes: the positioning assistance information is sent to the target terminal or one or more other terminals, wherein the one or more other terminals are one or more terminals that are in connection with the target terminal via a PC5 interface.

In an implementation, as shown in FIG. 3, before the above operation S301, the method may further include operation S300. At S300, positioning related information of a plurality of static UEs sent by a plurality of positioning servers is received, wherein the positioning related information of a static UE includes: a sequence ID of a positioning signal of the static UE, a sending frequency band and a receiving frequency band of the static UE, and a location of the static UE.

The above embodiment provides an example of content transmitted by the V2X server to complete downlink positioning of the target terminal. An example of the content transmitted by the V2X server to complete uplink positioning of the target terminal will be described below.

In an implementation, the method further includes: positioning configuration information of the target terminal is received; and the positioning configuration information of the target terminal is forwarded to at least two neighboring static UEs of the target terminal respectively.

The at least two static UEs that receive the positioning configuration information of the target terminal may belong to a same PLMN or different PLMNs.

In an implementation, the operation that the positioning configuration information of the target terminal is received includes: the positioning configuration information is received from the target terminal; or, the positioning configuration information that is sent from the target terminal and forwarded by one or more other terminals is received, wherein the one or more other terminals are one or more terminals that are in connection with the target terminal via a PC5 interface.

The positioning configuration information of the target terminal includes: a sequence ID of a positioning signal of the target terminal, and a sending frequency band and a time domain location of the target terminal.

Figure 4:
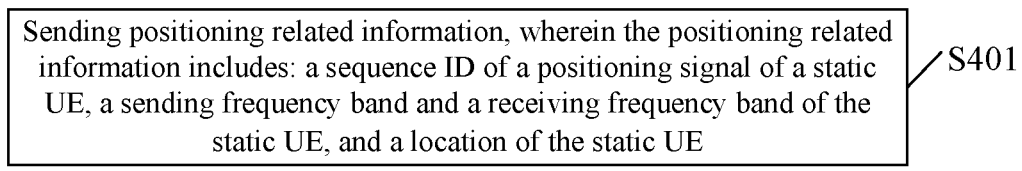
FIG. 4 is a schematic flowchart of an implementation flow of still another information transmission method according to some embodiments of the present disclosure.

The embodiments of the present disclosure also propose another information transmission method. FIG. 4 is a schematic diagram of an implementation flow of the other information transmission method according to some embodiments of the present disclosure. The information transmission method includes operation S401.

At S401, positioning related information is sent, wherein the positioning related information includes: a sequence ID of a positioning signal of a static UE, a sending frequency band and a receiving frequency band of the static UE, and a location of the static UE.

The above embodiment provides an example of content transmitted by the static UE to complete downlink positioning of a target terminal. An example executed by the static UE to complete uplink positioning of the target terminal will be described below.

In an implementation, the above method further includes: positioning configuration information of the target terminal is received; and positioning measurement is performed according to the positioning configuration information of the target terminal.

An information interaction process among the above target terminal, the positioning server, the V2X server and the static UE will be described in the following embodiments with reference to the drawings.

Figure 5:
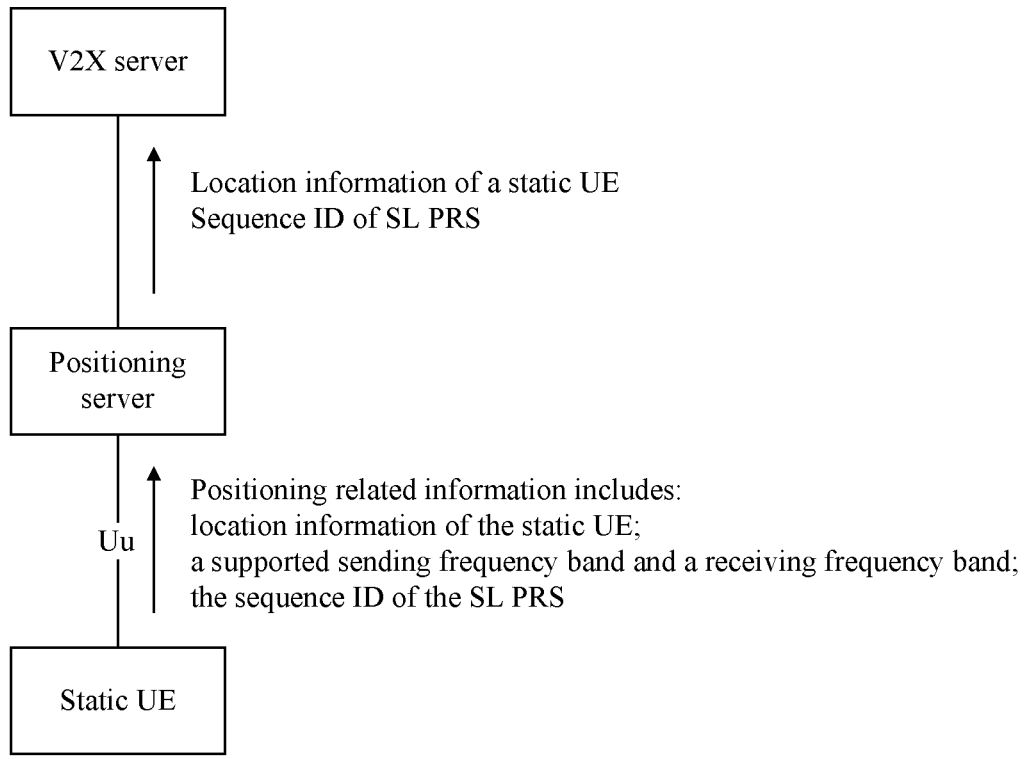
FIG. 5 is a schematic diagram of an implementation flow in which a static UE reports positioning related information according to some embodiments of the present disclosure.

FIG. 5 is a schematic diagram of an implementation flow in which a static UE reports positioning related information according to some embodiments of the present disclosure. The implementation flow includes the following operations.

At a first operation, sequence IDs of SL PRSs in a PC5 interface are uniformly allocated to static UEs in a V2X architecture. The static UE may be a Road Site Unit (RSU) or the like.

At a second operation, the static UEs send their respective positioning related information to a positioning server via Uu interfaces.

Further, the positioning related information of a static UE includes a location of the static UE, a sending frequency band and receiving frequency band supported by the static UE, and a sequence ID of the SL PRS.

Further, the sending frequency band and the receiving frequency band may include frequency bands other than an operator frequency band.

At a third operation, the positioning server sends stored location information of each static UE and the sequence ID of the SL PRS to the V2X server.

Figure 6:
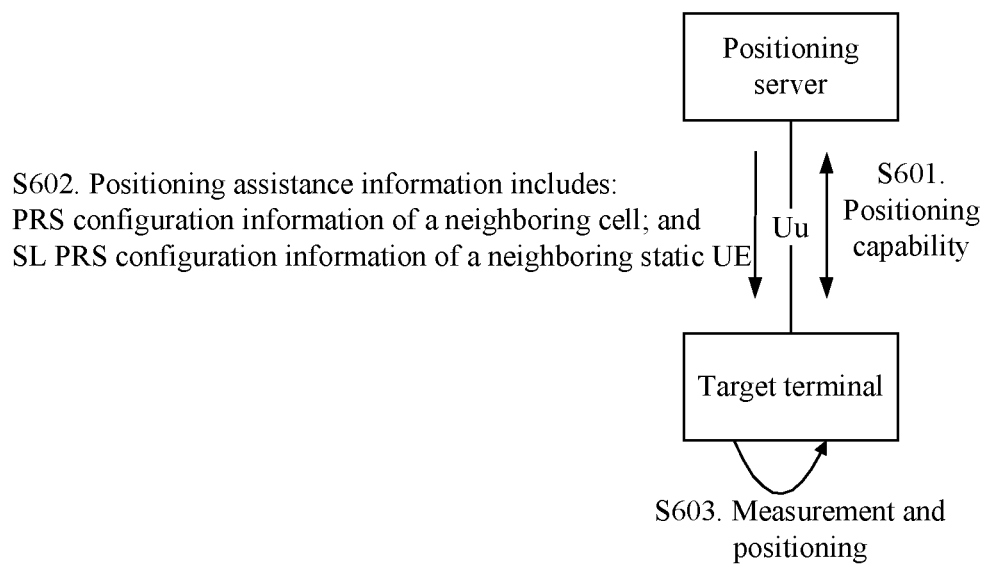
FIG. 6 is a first schematic diagram of a positioning flow according to some embodiments of the present disclosure.

FIG. 6 is a first schematic diagram of a positioning flow according to some embodiments of the present disclosure, which is applied for achieving single-PLMN positioning of a target terminal in a connected state within the coverage of a wireless communication network. As shown in FIG. 6, the positioning flow includes operations S601 to S603 which are described in detail below.

At S601, after a positioning service request is triggered, the target terminal interacts with a positioning server about a positioning capability.

Further, the positioning capability includes a supported positioning method, sending and receiving frequency bands supported by the target terminal, and whether V2X positioning is supported.

Further, the sending and receiving frequency bands supported by the target terminal may include frequency bands other than an operator frequency band.

At S602, the positioning server sends positioning assistance information to the target terminal via a Uu interface.

Further, the positioning assistance information includes PRS configuration information of a neighboring cell and SL PRS configuration information of at least one neighboring static UE.

Further, the SL PRS configuration information of the static UE includes an SL PRS sequence ID, and an SL PRS sending bandwidth and a time domain location of the static UE.

At S603, the target terminal performs positioning related measurement and positioning according to the positioning assistance information.

Further, the positioning may be a UE-assisted mode and a core network-assisted mode.

Further, in the core network-assisted mode, positioning related measurement information needs to be reported to the positioning server.

Figure 7:
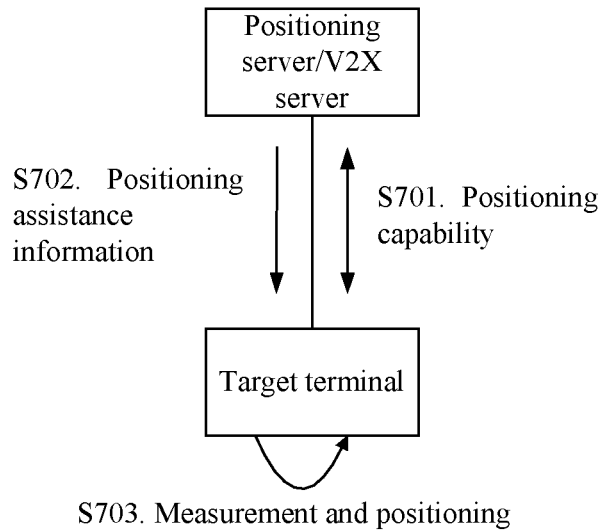
FIG. 7 is a second schematic diagram of a positioning flow according to some embodiments of the present disclosure.

FIG. 7 is a second schematic diagram of a positioning flow according to some embodiments of the present disclosure, which is applied to the cross-PLMN positioning of a target terminal in a connected state within the coverage of a wireless communication network. As shown in FIG. 7, the positioning flow includes operations S701 to S703 which are described in detail as follows.

At S701, after a positioning service request is triggered, the target terminal interacts with a positioning server or a V2X server about a positioning capability.

At S702, the positioning server or the V2X server sends positioning assistance information to the target terminal.

Further, the positioning assistance information sent by the V2X server includes SL PRS configuration information of static UEs of other operators.

At S703, the target terminal performs positioning related measurement and positioning according to the positioning assistance information.

Further, only UE-based positioning is supported in this scenario, and the related measurement may be from the static UEs of a plurality of operators.

Figure 8:
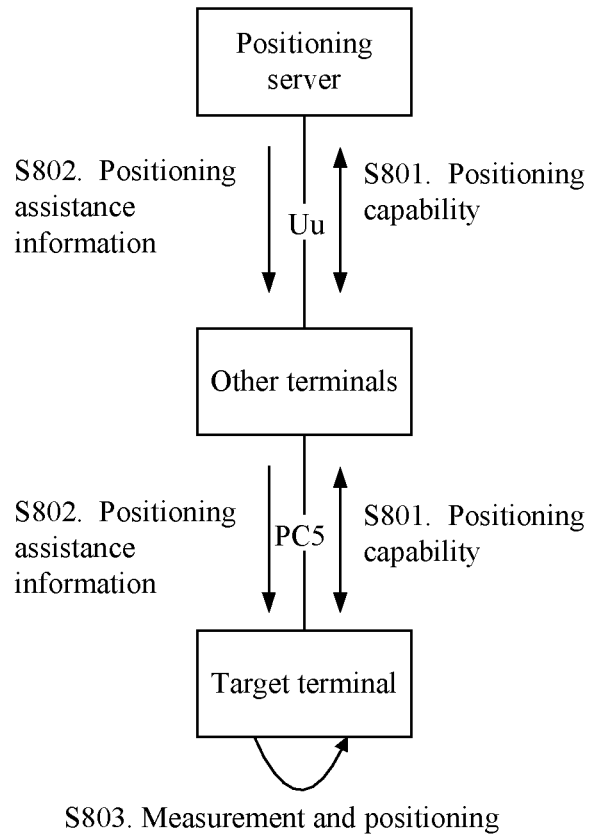
FIG. 8 is a third schematic diagram of a positioning flow according to some embodiments of the present disclosure.

FIG. 8 is a third schematic diagram of a positioning process according to some embodiments of the present disclosure, which is applied to single-PLMN positioning where a target terminal is beyond the coverage of the wireless communication network, but is connected to other terminals within the coverage of the wireless communication network via PC5 interfaces. As shown in FIG. 8, the positioning flow includes S801 to S803 which are described in detail below.

At S801, the target terminal interacts with a positioning server about a positioning capability through other terminals within the coverage of the wireless communication network that are connected to the target terminal via PC5 interfaces.

At S802, the positioning server forwards positioning assistance information to the target terminal through the other terminals within the coverage of the wireless communication network and then via PC5 interfaces.

At S803, the target terminal performs positioning related measurement and positioning according to the positioning assistance information.

Figure 9:
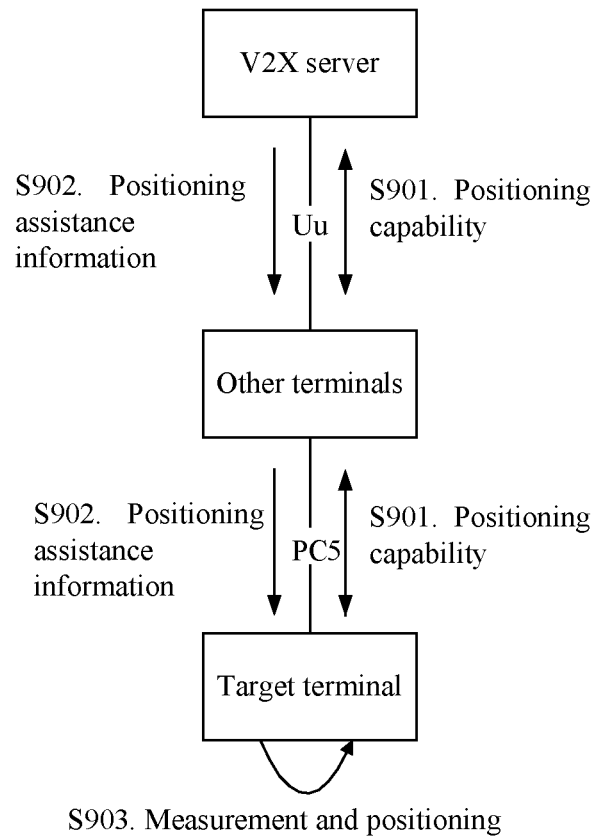
FIG. 9 is a fourth schematic diagram of a positioning flow according to some embodiments of the present disclosure.

FIG. 9 is a fourth schematic diagram of a positioning flow according to some embodiments of the present disclosure, which is applied to cross-PLMN positioning where a target terminal is beyond the coverage of the wireless communication network, but is connected to other terminals within the coverage of the wireless communication network via PC5 interfaces. As shown in FIG. 9, the positioning flow includes operations S901 to S903 which are described in detail below.

At S901, the target terminal interacts with a V2X server about a positioning capability through other terminals within the coverage of the wireless communication network that are connected to the target terminal via PC5 interfaces.

At S902, the V2X server forwards positioning assistance information to the target terminal through the other terminals within the coverage of the wireless communication network and then via PC5 interfaces.

At S903, the target terminal performs positioning related measurement and positioning according to the positioning assistance information.

Figure 10:
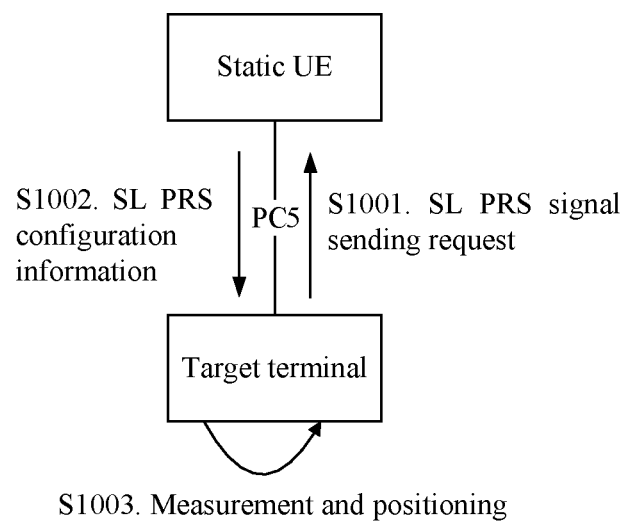
FIG. 10 is a fifth schematic diagram of a positioning flow according to some embodiments of the present disclosure.

FIG. 10 is a fifth schematic diagram of a positioning flow according to some embodiments of the present disclosure, which is applied to a scenario where a target terminal is completely beyond the coverage. As shown in FIG. 10, the positioning flow includes operations S1001 to S1003 which are described in detail below.

At S1001, the target terminal sends an SL PRS signal sending request to a neighboring static UE via a PC5 interface.

Further, the neighboring static UE may include a cross-operator static UE.

At S1002, the neighboring static UE sends its own SL PRS configuration information to the target terminal via the PC5 interface and sends an SL PRS.

At S1003, the target terminal performs location calculation by measuring the SL PRS of a neighboring static terminal.

Figure 11:
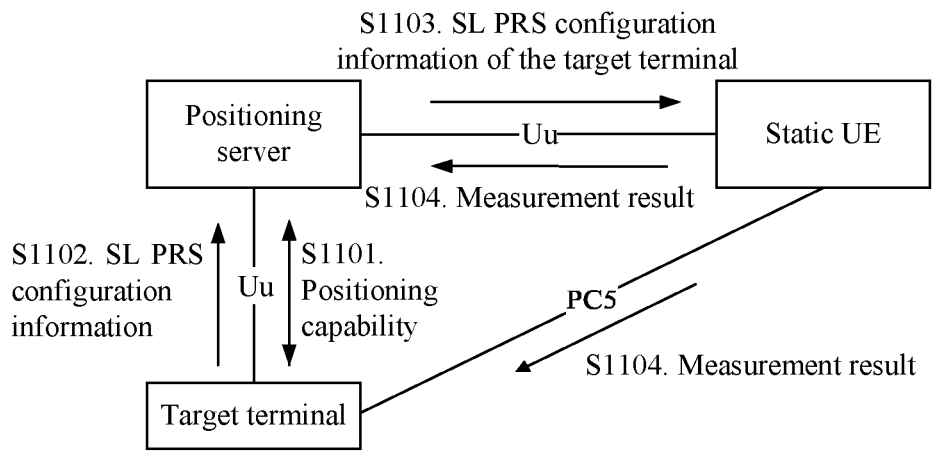
FIG. 11 is a sixth schematic diagram of a positioning flow according to some embodiments of the present disclosure.

FIG. 11 is a sixth schematic diagram of a positioning flow according to some embodiments of the present disclosure, which is applied to single-PLMN positioning of a target terminal in a connected state within the coverage of a wireless communication network. As shown in FIG. 11, the positioning flow includes operations S1101 to S1104 which are described in detail below.

At S1101, after a positioning service request is triggered, the target terminal interacts with a positioning server about a positioning capability.

At S1102, the target terminal sends its own SL PRS configuration information to the positioning server.

Further, the SL PRS configuration information of the target terminal may be configured by a wireless communication system or may be configured by the target terminal itself.

At S1103, the positioning server sends the SL PRS configuration information of the target terminal to a neighboring static UE via a Uu interface.

At S1104, the neighboring static UE performs measurement and reports a result to the positioning server or sends the result to the target terminal.

Figure 12:
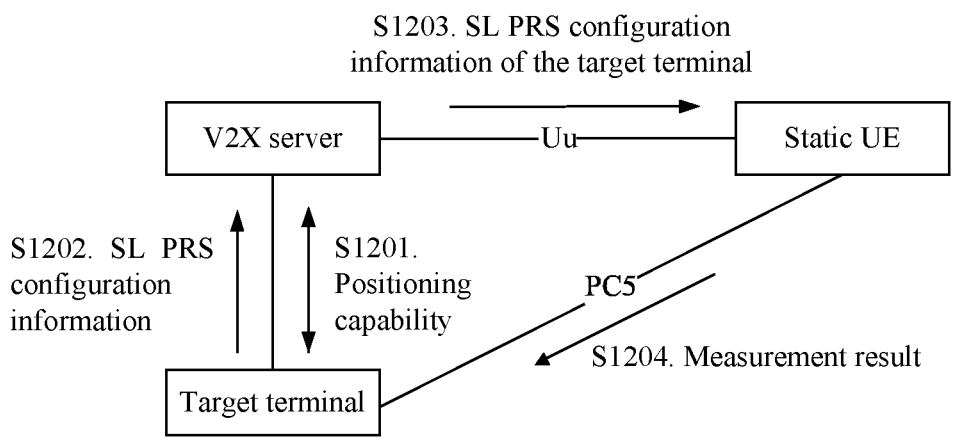
FIG. 12 is a seventh schematic diagram of a positioning flow according to some embodiments of the present disclosure.

FIG. 12 is a seventh schematic diagram of a positioning flow according to some embodiments of the present disclosure, which is applied to cross-PLMN positioning of a target terminal in a connected state within the coverage of a wireless communication network. As shown in FIG. 12, the positioning flow includes operations S1201 to S1204 which are described in detail below.

At S1201, after a positioning service request is triggered, a target node interacts with a V2X server about a positioning capability.

At S1202, the target terminal sends its own SL PRS configuration information to the V2X server.

At S1203, a positioning server sends the SL PRS configuration information of the target terminal to at least one neighboring static UE.

Further, the neighboring static UE may subscribe in different operators.

At S1204, the neighboring static UE performs measurement and reports a result to the positioning server or sends the result to the target terminal.

Figure 13:
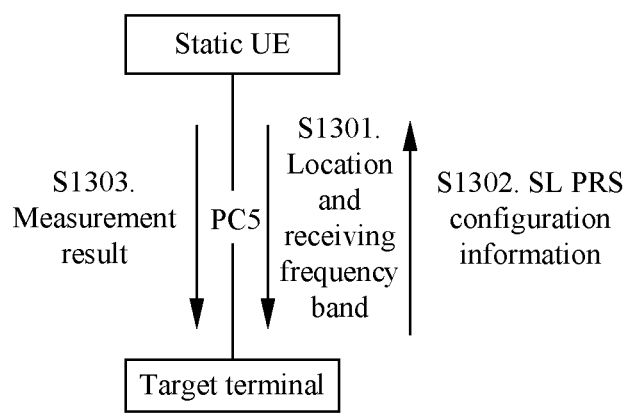
FIG. 13 is an eighth schematic diagram of a positioning flow according to some embodiments of the present disclosure.

FIG. 13 is an eighth schematic diagram of a positioning flow according to some embodiments of the present disclosure, which is applied to the positioning of a target terminal beyond the coverage of a wireless communication network. As shown in FIG. 13, the positioning flow includes operations S1301 to S1303 which are described in detail below.

At S1301, a neighboring static UE sends information such as a location and a receiving frequency band of the neighboring static UE to the target terminal via PC5 interface.

At S1302, the target terminal sends SL PRS configuration information of the target terminal to the neighboring static UE via the PC5 interface.

At S1303, the neighboring static UE measures an SL PRS of the target terminal and sends a measurement result to the target terminal. The target terminal calculates its own location.

Figure 14:
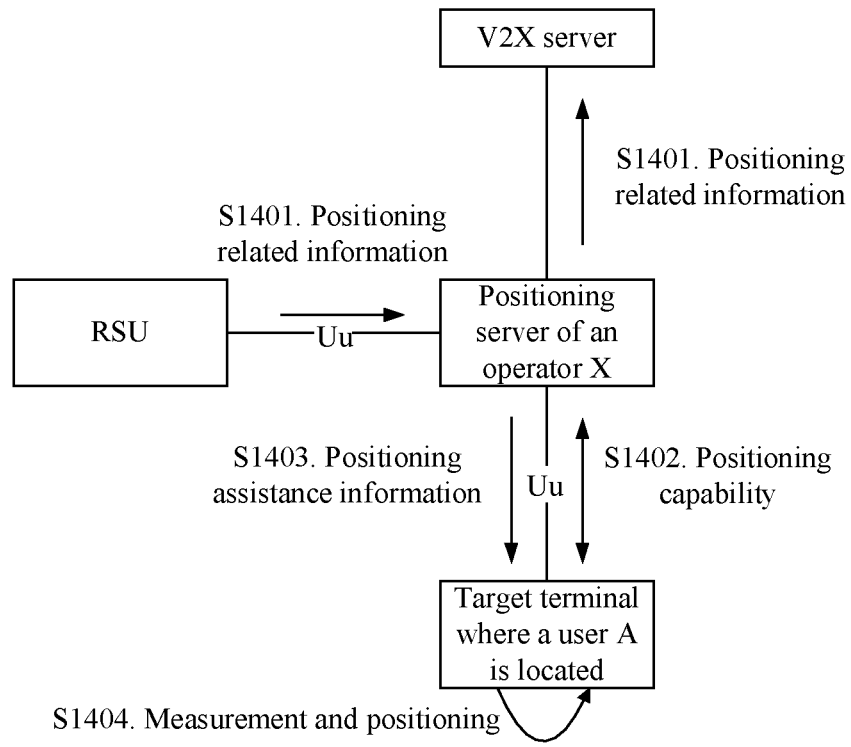
FIG. 14 is a ninth schematic diagram of a positioning flow according to some embodiments of the present disclosure.

FIG. 14 is a ninth schematic diagram of a positioning flow according to some embodiments of the present disclosure.

In the present embodiment, a user A in a connected state within the coverage of a wireless communication network subscribes in an operator X and needs to perform positioning. The operator uniformly allocates a sequence ID of an SL PRS in a PC5 interface to each static UE (such as RSU) in the V2X architecture of the operator. There are 4 RSUs around the user A, which are numbered as 1, 2, 3, and 4.

As shown in FIG. 14, the positioning flow includes the following operations S1401 to S1404.

At S1401, the four RSUs respectively upload their own positioning related information to a positioning server of the operator X via Uu interfaces. The positioning related information includes a location of the RSU, supported sending frequency band and receiving frequency band, and a sequence ID of the SL PRS. The above 4 RSUs do not support sending signals beyond the frequency band of the operator. The positioning server of the operator X sends positioning related information of each RSU stored by the positioning server to a unified V2X server.

At S1402, after a positioning service request is triggered, a target terminal where the user A is located interacts with the positioning server of the operator X about a positioning capability. The target terminal supports V2X positioning.

At S1403, the positioning server of the operator X sends positioning assistance information to the target terminal via the Uu interface. The positioning assistance information includes PRS configuration information of a neighboring cell and SL PRS configuration information of a neighboring RSU. The SL PRS configuration information of the neighboring RSU includes a sequence ID of the SL PRS, and an SL PRS sending bandwidth and a time domain location of the neighboring RSU.

At S1404, the target terminal measures, according to the positioning assistance information, a PRS of each neighboring cell and a time difference of arrival of the SL PRSs of the neighboring RSUs, and selects corresponding measurement data to perform location calculation by using an Observed Time Difference of Arrival (OTDOA).

Figure 15:
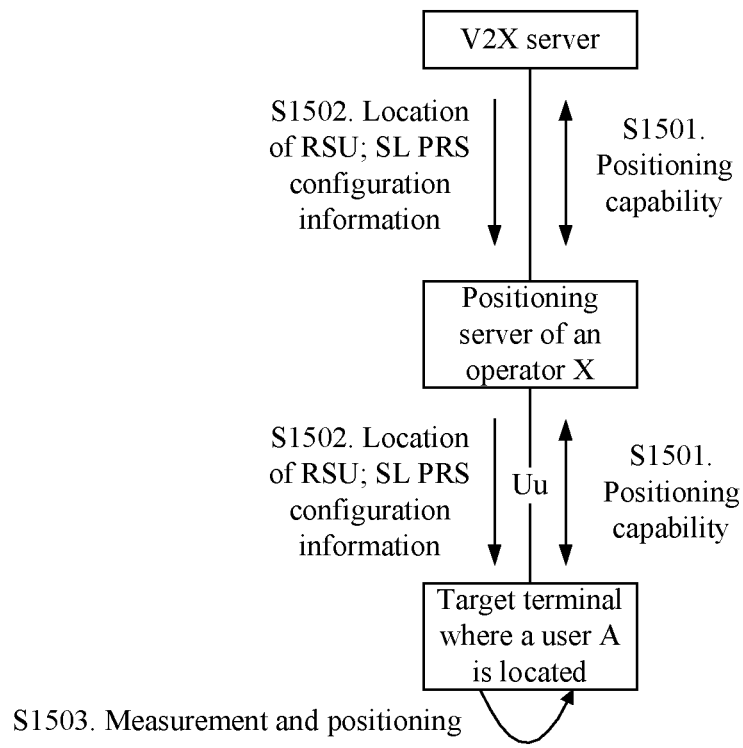
FIG. 15 is a tenth schematic diagram of a positioning flow according to some embodiments of the present disclosure.

FIG. 15 is a tenth schematic diagram of a positioning flow according to some embodiments of the present disclosure.

In the present embodiment, a user A in a connected state within the coverage of a wireless communication network subscribes in an operator X and needs to perform positioning. The operator uniformly allocates a sequence ID of an SL PRS in a PC5 interface to each static UE (such as RSU) in the V2X architecture of the operator. There are 4 RSUs around the user A, which are numbered as 1, 2, 3, and 4. The user A supports frequency band measurement of a plurality of operators.

As shown in FIG. 15, the positioning flow includes the following operations S1501 to S1503.

At S1501, a target terminal where the user A is located interacts with a V2X server about a positioning capability via a Uu interface and an interface between a positioning server and the V2X server. The target terminal supports V2X positioning.

At S1502, the V2X server sends, to the target terminal where the user A is located, the location and SL PRS configuration information of the RSU of each operator stored by the V2X server.

At S1503, the target terminal where the user A is located measures an SL PRS sent by the RSUs that subscribe in different operators, and then performs location calculation according to a time difference of arrival by using OTDOA.

Figure 16:
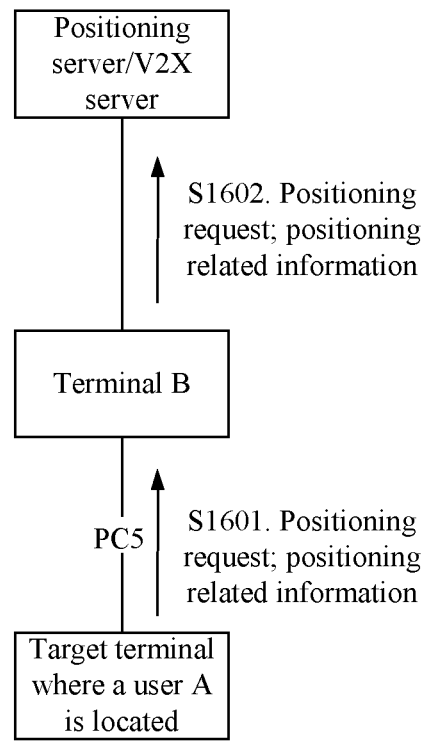
FIG. 16 is an eleventh schematic diagram of a positioning flow according to some embodiments of the present disclosure.

FIG. 16 is an eleventh schematic diagram of a positioning flow according to some embodiments of the present disclosure.

In the present embodiment, a target terminal where a user A is located does not establish a connection with a communication network, but establishes a PC5 connection with a terminal B which establishes a connection with the communication network.

As shown in FIG. 16, the positioning flow includes the following operations S1601 to S1602.

At S1601, the target terminal where the user A is located sends, to the terminal B, its own positioning request and positioning related information via a PC5 interface.

At S1602, the terminal B reports, to a positioning server or a V2X server, the aforementioned information of the target terminal where the user A is located.

Other flows are the same as those shown in FIG. 14 or FIG. 15, and thus will not be repeated herein.

Figure 17:
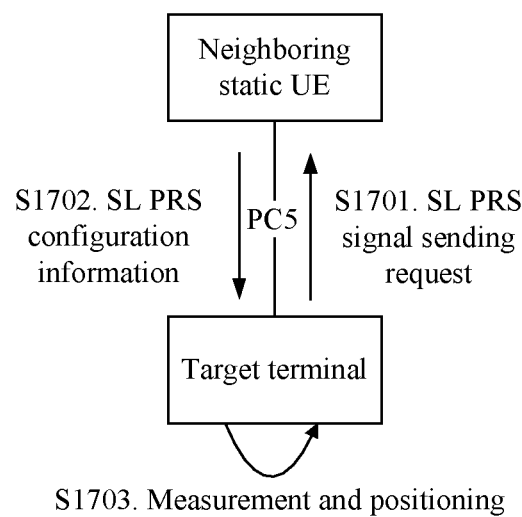
FIG. 17 is a twelfth schematic diagram of a positioning flow according to some embodiments of the present disclosure.

FIG. 17 is a twelfth schematic diagram of a positioning flow according to some embodiments of the present disclosure. The positioning flow includes the following operations S1701 to S1703.

At S1701, a target terminal sends an SL PRS signal sending request to neighboring static UEs (including a UE 1, a UE2, a UE3 and a UE4) via PC5 interfaces, wherein the UE1, the UE2, the UE3 and the UE4 may subscribe in the same operator or subscribe in different operators.

At S1702, the UE1, the UE2, the UE3 and the UE4 respectively send their own SL PRS configuration information to the target terminal via the PC5 interfaces, and send SL PRSs to the target terminal.

At S1703, the target terminal performs location calculation by measuring the SL PRSs of the neighboring static UEs.

Figure 18:
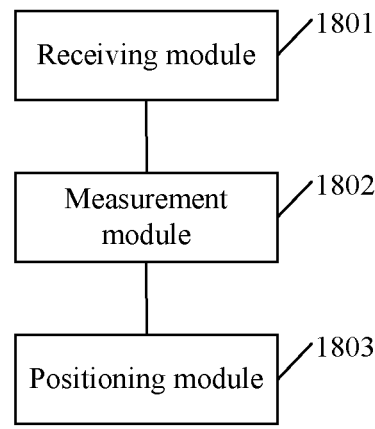
FIG. 18 is a schematic structural diagram of a positioning apparatus according to some embodiments of the disclosure.

The embodiments of the present disclosure also propose a positioning apparatus. FIG. 18 is a schematic structural diagram of a positioning apparatus according to some embodiments of the disclosure, as shown in FIG. 18, the positioning apparatus includes:

a receiving module 1801, configured to receive positioning assistance information;

a measurement module 1802, configured to perform positioning measurement according to the positioning assistance information; and a positioning module 1803, configured to position a target terminal by using a result of the positioning measurement.

The above positioning apparatus may be applied to the target terminal.

The embodiments of the present disclosure also propose an information transmission apparatus, including:

a first sending module, configured to send positioning assistance information, wherein the positioning assistance information includes: positioning configuration information of a neighboring cell of a target terminal, and positioning configuration information of at least one neighboring static UE of the target terminal.

The above information transmission apparatus may be applied to a target server.

The embodiments of the present disclosure also propose an information transmission apparatus, including:

a second sending module, configured to send positioning assistance information, wherein the positioning assistance information includes: positioning configuration information of at least two neighboring static UEs of a target terminal.

The above information transmission apparatus may be applied to a V2X server.

The embodiments of the present disclosure also propose an information transmission apparatus, including:

a third sending module, configured to send positioning related information, wherein the positioning related information includes: a sequence ID of a positioning signal of a static UE, a sending frequency band and a receiving frequency band of the static UE, and a location of the static UE.

The above information transmission apparatus may be applied to the static UE.

With regard to functions of various modules in the apparatuses in the embodiments of the present disclosure, reference may be made to the corresponding descriptions in the foregoing method embodiments, and thus will not be repeated herein.

Figure 19:
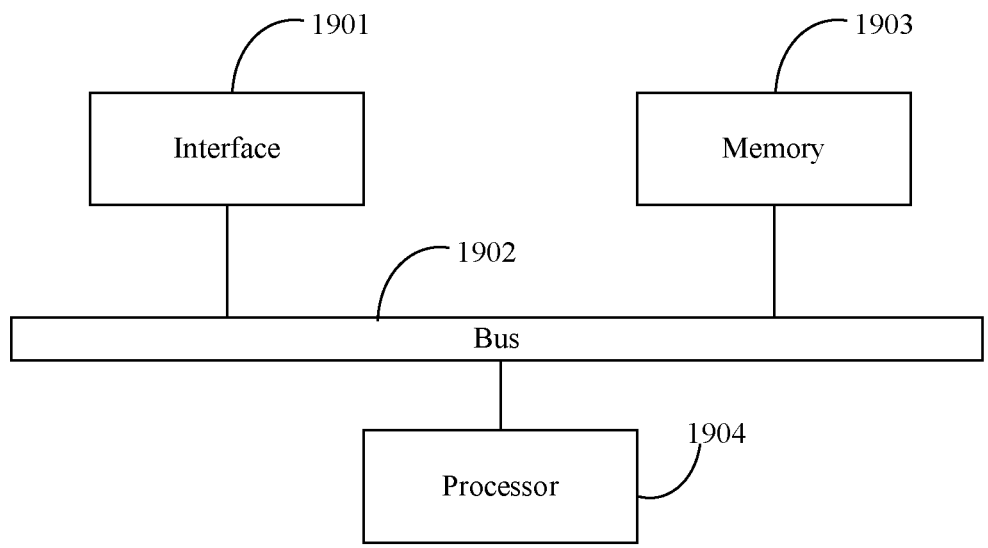
FIG. 19 is a schematic structural diagram of a terminal for positioning according to some embodiments of the present disclosure.

FIG. 19 is a schematic structural diagram of a terminal for positioning according to some embodiments of the present disclosure. As shown in FIG. 19, a terminal 1900 provided by the embodiment of the present disclosure includes: a memory 1903 and a processor 1904. The terminal 1900 may further include an interface 1901 and a bus 1902. The interface 1901, the memory 1903 and the processor 1904 are connected to each other via the bus 1902. The memory 1903 is configured to store an instruction. The processor 1904 is configured to read the instruction to execute the technical solution of the above method embodiment applied to a UE. Its implementation principles and technical effects are similar, and thus will not be repeated herein.

The schematic structural diagrams of a positioning server, a V2X server and a static UE for information transmission according to the embodiments of the present disclosure are similar to the structural schematic diagram of the above terminal for positioning, and thus will not be repeated herein.

The present disclosure provides a storage medium, wherein a computer program is stored in the storage medium, and when executed by a processor, the computer program implements the methods in the above embodiments.

Those having ordinary skill in the art should be aware that, the embodiments of the present disclosure may be provided as a method, a system, or a computer program product. Accordingly, the present disclosure may take the form of a hardware embodiment, a software embodiment, or an embodiment combining software with hardware aspects. Furthermore, the present disclosure may take the form of a computer program product that is embodied on one or more computer-usable storage media (including, but not limited to, disk memories, optical memories, and the like) having computer-usable program codes therein.

The present disclosure is described with reference to flow diagrams and/or block diagrams of the method, the device (system) and the computer program product according to the embodiments of the present disclosure. It should be understood that, each flow and/or block in the flow diagrams and/or block diagrams, and combinations of flows and/or blocks in the flow diagrams and/or block diagrams, may be implemented by computer program instructions. These computer program instructions may be provided for a general-purpose computer, a special-purpose computer, an embedded processor or processors of other programmable data processing devices, so as to generate a machine, such that instructions executed by the computers or the processors of the other programmable data processing devices generate apparatuses for implementing specified functions in one or more flows of the flow diagrams and/or one or more blocks of the block diagrams.

These computer program instructions may also be stored in a computer-readable memory that is capable of guiding the computers or the other programmable data processing devices to work in particular manners, such that the instructions stored in the computer-readable memory generate products including instruction apparatuses, and the instruction apparatuses implement the specified functions in one or more flows of the flow diagrams and/or one or more blocks of the block diagrams.

These computer program instructions may also be loaded on the computers or the other programmable data processing devices, so as to execute a series of operation operations on the computers or the other programmable data processing devices to produce processing implemented by the computers, such that the instructions executed on the computers or the other programmable data processing devices provide operations for implementing the specified functions in one or more flows of the flow diagrams and/or one or more blocks of the block diagrams.

The above descriptions are merely exemplary embodiments of the present disclosure, and are not intended to limit the protection scope of the present disclosure.

INDUSTRIAL APPLICABILITY

On the basis of the positioning method provided by the above embodiments, by performing positioning measurement according to the received positioning assistance information, and positioning the target terminal by using the measurement result, the positioning of a terminal device in a V2X scenario is realized.

What is claimed is:
1. A positioning method, comprising:
receiving positioning assistance information; wherein the positioning assistance information comprises: positioning configuration information of a neighboring cell, and positioning configuration information of at least one neighboring static user equipment (UE); or, the positioning assistance information comprises: positioning configuration information of at least two neighboring static user equipment (UEs); wherein the positioning configuration information of the neighboring static UE comprises: a sequence identifier (ID) of a positioning signal of the neighboring static UE, a sending frequency band and a time domain location of the neighboring static UE, and a location of the neighboring static UE;
performing positioning measurement according to the positioning assistance information; and
positioning a target terminal by using a result of the positioning measurement.
2. The method according to claim 1, wherein
the at least one neighboring static UE belongs to a same public land mobile network (PLMN).
3. The method according to claim 2, wherein receiving the positioning assistance information comprises:
receiving the positioning assistance information from a positioning server; or,
receiving the positioning assistance information that is sent from a positioning server and forwarded by one or more other terminals, wherein the one or more other terminals are one or more terminals that are in connection with the target terminal via a PC5 interface.
4. The method according to claim 2, wherein performing positioning measurement according to the positioning assistance information comprises:
performing positioning measurement on a positioning signal of the neighboring cell and a positioning signal of the at least one neighboring static UE according to the positioning assistance information.
5. The method according to claim 1, wherein
the at least two neighboring static UEs belong to different public land mobile networks (PLMNs); or,
the at least two neighboring static UEs belong to a same PLMN or different PLMNs.
6. The method according to claim 5, wherein
in a case where the at least two neighboring static UEs belong to different PLMNs, receiving the positioning assistance information comprises: receiving the positioning assistance information from a Vehicle to Everything (V2X) server; or, receiving the positioning assistance information that is sent from a V2X server and forwarded by one or more other terminals, wherein the one or more other terminals are one or more terminals that are in connection with the target terminal via a PC5 interface;
in a case where the at least two neighboring static UEs belong to a same PLMN or different PLMNs, receiving the positioning assistance information comprises: receiving the positioning assistance information from the at least two neighboring static UEs.
7. The method according to claim 5, wherein performing positioning measurement according to the positioning assistance information comprises:
performing positioning measurement on positioning signals of the at least two neighboring static UEs according to the positioning assistance information.

8. The method according to claim 1, further comprising:
sending positioning configuration information of the target terminal.

9. The method according to claim 8, wherein sending the positioning configuration information of the target terminal comprises:
sending the positioning configuration information of the target terminal to a positioning server, a Vehicle to Everything (V2X) server, or one or more terminals that are in connection with the target terminal via a PC5 interface.

10. The method according to claim 8, wherein the positioning configuration information of the target terminal comprises:
a sequence identifier (ID) of a positioning signal of the target terminal, and a sending frequency band and a time domain location of the target terminal.

11. A terminal for positioning, wherein the terminal comprises: a processor and a memory;
the memory is configured to store an instruction; and
the processor is configured to read the instruction to execute the method according to claim 1.

12. A non-transitory storage medium, wherein a computer program is stored in the storage medium, and when executed by a processor, the computer program implements the method according to claim 1.

13. An information transmission method, comprising:
sending positioning assistance information, wherein the positioning assistance information comprises: positioning configuration information of a neighboring cell of a target terminal, and positioning configuration information of at least one neighboring static user equipment (UE) of the target terminal;
or,
sending positioning assistance information, wherein the positioning assistance information comprises: positioning configuration information of at least two neighboring static user equipment (UEs) of a target terminal;
or,
sending positioning related information, wherein the positioning related information comprises: a sequence identifier (ID) of a positioning signal of a static user equipment (UE), a sending frequency band and a receiving frequency band of the static UE, and a location of the static UE;
wherein the positioning assistance information comprises: positioning configuration information of a neighboring cell, and positioning configuration information of at least one neighboring static user equipment (UE); or, the positioning assistance information comprises: positioning configuration information of at least two neighboring static user equipment (UEs); wherein the positioning configuration information of the neighboring static UE comprises: a sequence identifier (ID) of a positioning signal of the neighboring static UE, a sending frequency band and a time domain location of the neighboring static UE, and a location of the neighboring static UE.

14. The method according to claim 13, further comprising:
receiving positioning configuration information of the target terminal; and
forwarding the positioning configuration information of the target terminal to at least two neighboring static UEs of the target terminal respectively.

15. The method according to claim 14, wherein the at least two static UEs that receive the positioning configuration information of the target terminal belong to a same public land mobile network (PLMN) or different PLMNs.

16. A positioning server for information transmission, wherein the positioning server comprises: a processor and a memory;
the memory is configured to store an instruction; and
the processor is configured to read the instruction to execute the method according to claim 13 to send positioning assistance information, wherein the positioning assistance information comprises: positioning configuration information of a neighboring cell of a target terminal, and positioning configuration information of at least one neighboring static user equipment (UE) of the target terminal.

17. A Vehicle to Everything (V2X) server for information transmission, wherein the V2X server comprises: a processor and a memory;
the memory is configured to store an instruction; and
the processor is configured to read the instruction to execute the method according to claim 13 to send positioning assistance information, wherein the positioning assistance information comprises: positioning configuration information of at least two neighboring static user equipment (UEs) of a target terminal.

18. Static user equipment (UE) for information transmission, wherein the static UE comprises: a processor and a memory;
the memory is configured to store an instruction; and
the processor is configured to read the instruction to execute the method according to claim 13 to send positioning related information, wherein the positioning related information comprises: a sequence identifier (ID) of a positioning signal of a static user equipment (UE), a sending frequency band and a receiving frequency band of the static UE, and a location of the static UE.

19. A non-transitory storage medium, wherein a computer program is stored in the storage medium, and when executed by a processor, the computer program implements the method according to claim 13.

* * * * *